US012630458B2

(12) United States Patent
Azuma

(10) Patent No.: US 12,630,458 B2
(45) Date of Patent: May 19, 2026

(54) METHOD FOR MANUFACTURING GLASS PLATE AND METHOD FOR MANUFACTURING MAGNETIC DISK

(71) Applicant: HOYA CORPORATION, Tokyo (JP)

(72) Inventor: Shuhei Azuma, Hung Yen Province (VN)

(73) Assignee: HOYA CORPORATION, Tokyo (JP)

( * ) Notice: Subject to any disclaimer, the term of this patent is extended or adjusted under 35 U.S.C. 154(b) by 548 days.

(21) Appl. No.: 17/623,056

(22) PCT Filed: Jun. 29, 2020

(86) PCT No.: PCT/JP2020/025596

§ 371 (c)(1),
(2) Date: Dec. 27, 2021

(87) PCT Pub. No.: WO2020/262702

PCT Pub. Date: Dec. 30, 2020

(65) Prior Publication Data

US 2022/0227654 A1      Jul. 21, 2022

(30) Foreign Application Priority Data

Jun. 28, 2019    (JP) ................................. 2019-122243

(51) Int. Cl.
*C03B 33/08*            (2006.01)
*B23K 26/352*           (2014.01)
            (Continued)
(52) U.S. Cl.
CPC .......... *C03B 33/082* (2013.01); *B23K 26/354* (2015.10); *B23K 26/3576* (2018.08);
            (Continued)

(58) Field of Classification Search
None
See application file for complete search history.

(56) References Cited

U.S. PATENT DOCUMENTS 5,096,017 A * 3/1992 Rey .......................... B01J 19/10
                                              34/664
6,521,862 B1 * 2/2003 Brannon ............ G11B 23/0021
                    (Continued)

FOREIGN PATENT DOCUMENTS

CN        1982179 A      6/2007
CN      101431008 A      5/2009
                    (Continued)

OTHER PUBLICATIONS

PE2E machine translation JP2002150546 (Year: 2002).*
                    (Continued)

*Primary Examiner* — Jodi C Franklin
(74) *Attorney, Agent, or Firm* — Spencer Fane LLP

(57) ABSTRACT

When a laser beam is used to perform shape processing on an edge surface of a disk-shaped glass plate, in order to suppress strain (retardation values) in the main surface of the glass plate, the disk-shaped glass plate is floated above a base, and the edge surface of the glass plate is processed into a target shape by irradiating the edge surface with the laser beam while contactlessly heating the glass plate in a state where the glass plate is floated, and moving the laser beam relative to the edge surface in the circumferential direction of the disk-shaped glass plate.

15 Claims, 3 Drawing Sheets

(51) Int. Cl.

| | |
|---|---|
| *B23K 26/354* | (2014.01) |
| *C03B 23/02* | (2006.01) |
| *C03C 17/00* | (2006.01) |
| *C03C 23/00* | (2006.01) |
| *G11B 5/73* | (2006.01) |
| *G11B 5/84* | (2006.01) |
| *B23K 103/00* | (2006.01) |

(52) U.S. Cl.
CPC ............ *C03B 23/02* (2013.01); *C03C 17/002* (2013.01); *C03C 23/0025* (2013.01); *G11B 5/73921* (2019.05); *G11B 5/8404* (2013.01); *B23K 2103/54* (2018.08)

(56) References Cited

U.S. PATENT DOCUMENTS

| | | | | | |
|---|---|---|---|---|---|
| 6,795,274 | B1 * | 9/2004 | Hsieh | .................. | G11B 5/8404 |
| | | | | | 219/121.72 |
| 6,808,784 | B2 * | 10/2004 | Hashimoto | ............. | C03C 19/00 |
| | | | | | 428/848.6 |
| 6,845,635 | B2 * | 1/2005 | Watanabe | ........... | C03C 23/0025 |
| 8,893,525 | B2 * | 11/2014 | Lee | .......................... | C03B 29/12 |
| | | | | | 65/95 |
| 10,384,306 | B1 * | 8/2019 | Beresford | .......... | B23K 26/0869 |
| 11,884,582 | B2 * | 1/2024 | Azuma | ............. | B23K 26/3576 |
| 2002/0108400 | A1 * | 8/2002 | Watanabe | .......... | G11B 5/73921 |
| | | | | | 428/64.2 |
| 2004/0052284 | A1 * | 3/2004 | Krause | .................. | H01S 3/0941 |
| | | | | | 372/36 |
| 2005/0223744 | A1 * | 10/2005 | Horisaka | .............. | G11B 5/8404 |
| 2008/0041833 | A1 * | 2/2008 | Cavallaro | ............... | C03B 29/16 |
| | | | | | 219/121.85 |
| 2008/0088830 | A1 * | 4/2008 | Serikawa | ............. | G01N 21/958 |
| | | | | | 356/600 |
| 2008/0202167 | A1 * | 8/2008 | Cavallaro | ............. | C03B 25/025 |
| | | | | | 219/121.68 |
| 2009/0190123 | A1 * | 7/2009 | Hariyama | .......... | G01N 21/8922 |
| | | | | | 356/237.2 |
| 2010/0147813 | A1 * | 6/2010 | Lei | ...................... | C03B 33/0222 |
| | | | | | 219/121.72 |
| 2011/0129650 | A1 * | 6/2011 | Shashidhar | ............. | C03C 3/091 |
| | | | | | 428/192 |
| 2012/0110528 | A1 * | 5/2012 | Newcomb | ........... | G06F 30/3323 |
| | | | | | 716/106 |
| 2012/0167626 | A1 * | 7/2012 | Lee | .......................... | C03B 29/08 |
| | | | | | 65/182.2 |
| 2012/0211923 | A1 * | 8/2012 | Garner | .................. | B23K 26/60 |
| | | | | | 264/400 |
| 2013/0089754 | A1 * | 4/2013 | Nishimori | ................ | G11B 5/82 |
| | | | | | 428/846.9 |

| | | | | | |
|---|---|---|---|---|---|
| 2014/0033768 | A1 * | 2/2014 | Isono | .................... | C03B 11/122 |
| | | | | | 65/90 |
| 2014/0290310 | A1 * | 10/2014 | Green | ................ | B23K 26/0006 |
| | | | | | 65/117 |
| 2015/0165548 | A1 * | 6/2015 | Marjanovic | ........... | C03B 33/091 |
| | | | | | 219/121.73 |
| 2015/0255103 | A1 * | 9/2015 | Ueda | .................. | G11B 5/73921 |
| | | | | | 428/836 |
| 2015/0258553 | A1 * | 9/2015 | Kobayashi | ........ | H01L 21/67109 |
| | | | | | 427/372.2 |
| 2015/0279721 | A1 * | 10/2015 | Kikumoto | ......... | H01L 21/68728 |
| | | | | | 279/134 |
| 2016/0005431 | A1 * | 1/2016 | Tamaki | .................. | G11B 5/739 |
| | | | | | 428/846.9 |
| 2016/0237563 | A1 * | 8/2016 | Sieber | ................. | C23C 16/4412 |
| 2016/0237565 | A1 * | 8/2016 | Sieber | .............. | C23C 16/45508 |
| 2016/0240419 | A1 * | 8/2016 | Sieber | .............. | C23C 16/45576 |
| 2018/0037490 | A1 | 2/2018 | Rossmeier et al. | | |
| 2019/0144325 | A1 * | 5/2019 | Bowden | .................. | C03B 33/04 |
| | | | | | 219/121.69 |
| 2019/0362754 | A1 * | 11/2019 | Sato | ........................ | C03C 3/097 |
| 2022/0115039 | A1 * | 4/2022 | Matsumoto | ........ | G11B 33/1426 |
| 2022/0298053 | A1 * | 9/2022 | Takizawa | ................ | C03B 29/02 |
| 2023/0192530 | A1 * | 6/2023 | Sato | ........................ | G11B 5/235 |
| | | | | | 360/131 |

FOREIGN PATENT DOCUMENTS

| | | | | | |
|---|---|---|---|---|---|
| CN | 102484089 | A | 5/2012 | | |
| CN | 206537949 | U | 10/2017 | | |
| CN | 107438585 | A | 12/2017 | | |
| CN | 109822215 | A | 5/2019 | | |
| JP | 02-048423 | A | 2/1990 | | |
| JP | 2612332 | B2 | 5/1997 | | |
| JP | 2002-150546 | A | 5/2002 | | |
| JP | 2006-079800 | A | 3/2006 | | |
| JP | 2010519164 | A | 6/2010 | | |
| JP | 2013-004114 | A | 1/2013 | | |
| JP | 2015-067500 | A | 4/2015 | | |
| JP | 2015-076115 | A | 4/2015 | | |
| JP | 2018-174005 | A | 11/2018 | | |
| JP | 2019-011242 | A | 1/2019 | | |
| JP | 2019507092 | A * | 3/2019 | .......... | C03B 27/016 |
| WO | WO-2013011877 | A1 * | 1/2013 | ............ | B23K 26/40 |
| WO | 2014/178416 | A1 | 11/2014 | | |
| WO | WO-2017132491 | A1 * | 8/2017 | .......... | C03B 27/012 |
| WO | WO-2017132698 | A1 * | 8/2017 | .......... | C03B 27/016 |

OTHER PUBLICATIONS

E. H. Brandt Levitation in Physics 1989 (Year: 1989).*
International Search Report in PCT/JP2020/025596 dated Sep. 15, 2020.

* cited by examiner

METHOD FOR MANUFACTURING GLASS PLATE AND METHOD FOR MANUFACTURING MAGNETIC DISK

CROSS REFERENCE TO RELATED APPLICATIONS

This is a U.S. National stage application of International Patent Application No. PCT/JP2020/025596, filed on Jun. 29, 2020, which claims priority to Japanese Patent Application No. 2019-122243 filed in Japan on Jun. 28, 2019. The entire contents of Japanese Patent Application No. 2019-122243 are hereby incorporated herein by reference.

BACKGROUND

Field of the Invention

The present invention relates to a method for manufacturing a glass plate including processing for performing shape processing on an edge surface of a disk-shaped glass plate, and a method for manufacturing a magnetic disk using the method for manufacturing a glass plate.

Background Information

A magnetic disk obtained by providing a magnetic layer on a nonmagnetic glass substrate for a disk-shaped magnetic disk is used in a hard disk drive for recording data.

When a magnetic-disk glass substrate is manufactured, particles are likely to originate from an edge surface of a disk-shaped glass blank that is the base of the magnetic-disk glass substrate that is to be a final product, and therefore it is preferable that the surfaces of edge surfaces of the disk-shaped glass blank are smoothened in order to inhibit fine particles from adhering to main surfaces of the disk-shaped glass blank, and from adversely affecting the performance of the magnetic disk. Also, it is preferable that edge surfaces of the glass plate have target shapes to realize precise incorporation of a magnetic disk into an HDD device, and make an outer circumferential edge surface of the glass substrate suitable to be held by a jig for holding the outer circumferential edge surface when a magnetic film is formed on the main surfaces of the glass substrate.

A method of chamfering an edge of a glass plate using a laser beam is known as a method for making an edge surface of a glass plate into a target shape. By irradiating the glass plate with a laser beam in a state where the entire glass member, which is a glass plate, is kept at a predetermined temperature that is higher than room temperature, such that an irradiation spot moves along a corner portion of the glass member, at least a portion of the corner portion is heated to a temperature higher than that of the other portion, softened, and chamfered, for example (Japanese Patent No. 2612332).

When chamfering is performed, in general, the glass member is placed on a support base in advance, fixed to the support base, and heated, and the corner portion of the glass member is then irradiated with a laser beam.

SUMMARY

However, it was found that when chamfering is performed using the above-described conventional method, a large strain remained on the processed substrate. When the cause thereof was examined, it was found that heat is released from the heated glass member to the support base of the glass member through these contact portions, and thus the glass member cannot be substantially uniformly heated, and as a result, the temperature history during processing changes depending on the in-plane position of a main surface of the glass member, and the difference between the maximum strain and the minimum strain (retardation values) in the main surface of the glass member, that is, a strain distribution (variation in strain), increases. When this strain distribution is large, the glass member may be likely to warp or crack in various steps such as the subsequent glass member processing step.

In view of this, the present invention aims to provide a method for manufacturing a glass plate and a method for manufacturing a magnetic disk with which when a glass plate is manufactured by performing shape processing by irradiating an end surface of a disk-shaped glass plate with a laser beam, it is possible to suppress a distribution of in-plane strain (retardation values) in the main surface of the glass plate.

An aspect of the present invention is a method for manufacturing a glass plate including processing for performing shape processing on an edge surface of a disk-shaped glass plate. This manufacturing method includes:

a step of floating the disk-shaped glass plate above a base; and a step of processing the edge surface of the glass plate into a target shape by irradiating the edge surface with a laser beam while contactlessly heating the glass plate in a state where the glass plate is floated, and moving the laser beam relative to the edge surface in a circumferential direction of the disk-shaped glass plate.

An aspect of the present invention is also a method for manufacturing a glass plate including processing for performing shape processing on an edge surface of a disk-shaped glass plate. This manufacturing method includes:

a step of disposing the disk-shaped glass plate and a base such that the glass plate and the base do not come into contact with each other; and a step of processing the edge surface of the glass plate into a target shape by irradiating the edge surface with a laser beam while contactlessly heating the glass plate disposed in an atmosphere, and moving the laser beam relative to the edge surface in a circumferential direction of the disk-shaped glass plate.

It is preferable that the glass plate is contactlessly heated such that an in-plane temperature difference in a main surface thereof is 50° C. or less.

It is preferable that, in the step of processing the edge surface into the target shape, irradiation conditions of the laser beam are set so as to form a chamfered surface on the edge surface.

At this time, it is preferable that the conditions are set such that a ratio C/Th of a length C of the chamfered surface extending in a radial direction of the main surface, relative to a thickness Th of the glass plate is in a range of 0.1 to 0.7.

It is preferable that an arithmetic average roughness Ra of the edge surface formed by the laser beam is 0.02 μm or less.

It is preferable that a ratio W2/D of a length W2 in the circumferential direction of luminous flux of the laser beam with which the edge surface is irradiated, relative to a diameter D of the glass plate is in a range of 0.03 to 0.2.

It is preferable that a cross-sectional intensity distribution of the laser beam with which the edge surface is irradiated is a single mode, and W1>Th holds true and Pd×Th is in a range of 0.8 to 3.5 [W/mm] where a width of luminous flux of the laser beam in a thickness direction of the glass plate at an irradiation position of the edge surface is W1 [mm], a thickness of the glass plate is Th [mm], and a power density of the laser beam is Pd.

It is preferable that the power density Pd is set such that a diameter of the glass plate formed through irradiation with the laser beam is larger than a diameter of the glass plate before being irradiated with the laser beam.

It is preferable that a moving speed at which the laser beam moves along the edge surface is in a range of 0.7 to 140 [mm/s].

It is preferable that the glass plate has a Young's modulus of 70 [GPa] or more.

It is preferable that the glass plate has a coefficient of linear thermal expansion of $100 \times 10^{-7}$ $[1/K]$ or less.

It is preferable that the glass plate has a thickness Th of 0.7 mm or less.

It is preferable that the method for manufacturing a glass plate includes a step of grinding or polishing a main surface of the glass plate in which the edge surface has been processed into the target shape, in which no edge surface is polished after the edge surface has been processed into the target shape and before the main surface is ground or polished, or even if the edge surface is polished, an amount of machining allowance for polishing the edge surface is 5 μm or less.

Another aspect of the present invention is a method for manufacturing a magnetic disk, in which a magnetic film is formed on a main surface of the glass plate manufactured using the method for manufacturing a glass plate.

According to the above-described method for manufacturing a glass plate and the above-described method for manufacturing a magnetic disk, it is possible to suppress a strain (retardation value) distribution in the main surface of the glass plate when manufacturing the glass plate by performing shape processing by irradiating an edge surface of the disk-shaped glass plate with a laser beam.

DETAILED DESCRIPTION OF THE EMBO DIM ENTS

Figure 1:
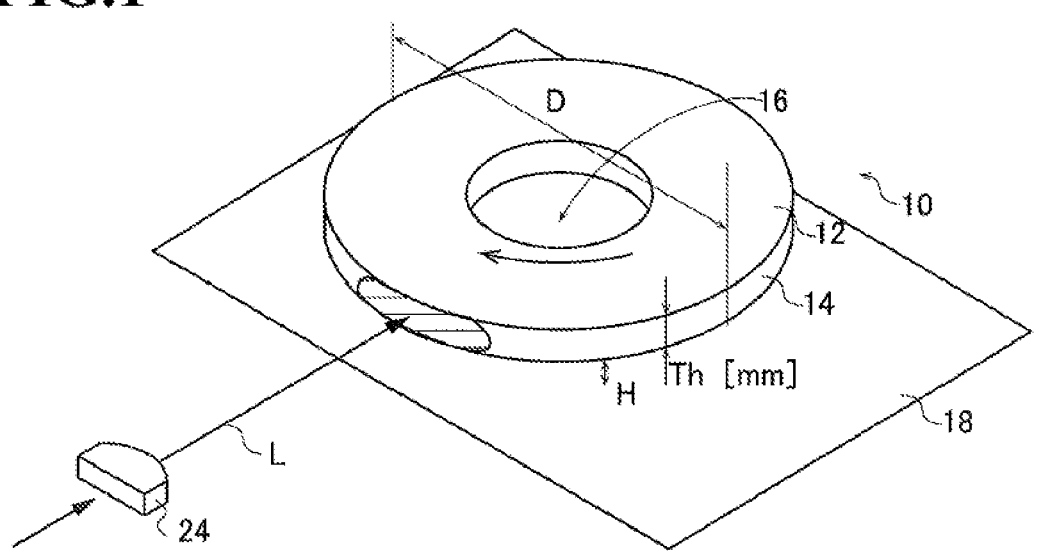
FIG. 1 is a diagram illustrating laser irradiation performed in a method for manufacturing a glass plate according to an embodiment.
Figure 2:
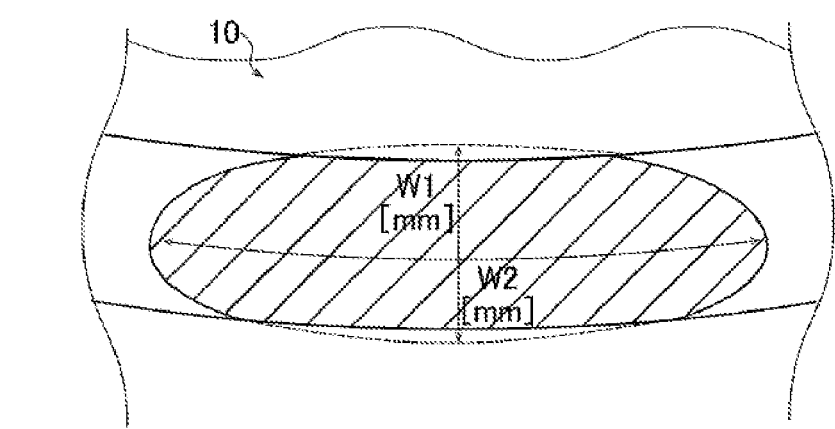
FIG. 2 is a diagram illustrating one example of the shape of luminous flux at a laser irradiation position.
Figure 3:
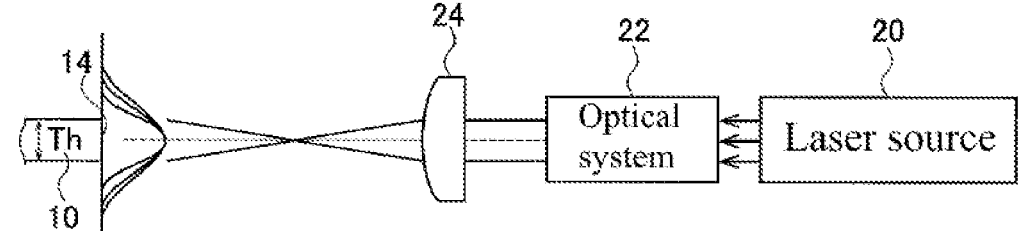
FIG. 3 is a diagram illustrating luminous flux at a laser irradiation position and light intensity distribution.
Figure 4:
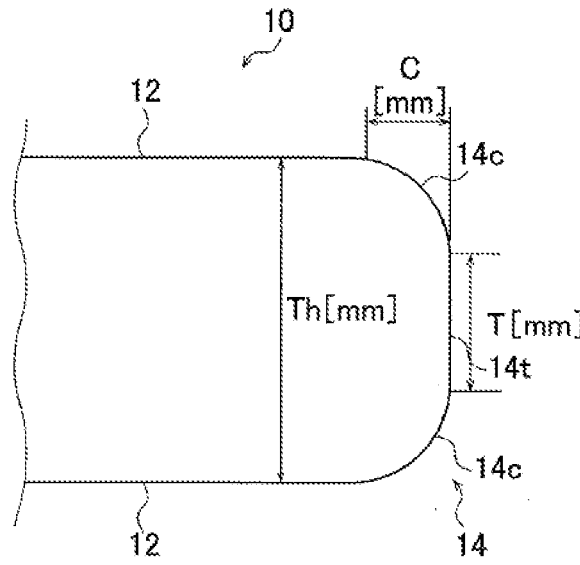
FIG. 4 is a diagram illustrating the shape of an edge surface after being subjected to shape processing using a laser beam.

FIG. 1 is a diagram illustrating laser irradiation performed in a method for manufacturing a glass plate according to an embodiment. FIG. 2 is a diagram illustrating one example of the shape of luminous flux at a laser irradiation position. FIG. 3 is a diagram illustrating luminous flux at the laser irradiation position and the light intensity distribution. FIG. 4 is a diagram illustrating the shape of an edge surface after being subjected to shape processing using a laser beam.

A glass plate, which is to be subjected to shape processing using a method for manufacturing a glass plate according to this embodiment, has a disk shape in which a circular hole is provided to form an inner circumferential end concentric with an outer circumferential end, at a central position of the disk shape. In other words, the glass plate of this embodiment is an annular glass plate. The disk shape of the glass plate in this embodiment may be a disk shape in which the circular hole is not provided, in addition to an annular shape. Examples of glass plates that are to be subjected to shape processing using the method for manufacturing a glass plate according to this embodiment include not only magnetic-disk glass substrates but also glass spacers for HDDs and other products (pre-processing intermediates for both cases are included).

In order to produce a glass plate whose edge surface has a target shape from this glass plate, or to prevent portions connecting the edge surface and main surfaces of the glass plate to each other from being angular edge portions, shape processing for chamfering the portion connecting the main surfaces and the edge surface of the glass plate to each other is performed on the glass plate.

In particular, when a disk-shaped magnetic-disk glass substrate provided with a circular hole is manufactured, it is desired that edge surfaces of the disk-shaped glass plate, which is the base of a magnetic-disk glass substrate that is to be a final product, have target shapes to realize precise incorporation of a magnetic disk into an HDD device, and allow an edge surface of the glass substrate to be reliably held by a jig when a magnetic film is formed on the main surfaces of the glass substrate. Furthermore, it is desired that the surfaces of edge surfaces on which particles are likely to form are smoothened in order to inhibit fine particles from adhering to the main surfaces, and from adversely affecting the performance of the magnetic disk. Thus, in this embodiment, a laser beam is used to perform shape processing for chamfering.

Specifically, as shown in FIG. 1, a disk-shaped glass plate 10 provided with a circular hole 16 has main surfaces 12 and an edge surface 14. Although an outer circumferential edge surface is denoted as the edge surface 14 to be subjected to shape processing using a laser beam L in the example shown in FIG. 1, an inner circumferential edge surface extending along the circular hole 16 can also be subjected to shape processing using the laser beam. It is sufficient that at least one of the inner circumferential edge surface and the outer circumferential edge surface is subjected to shape processing using the laser beam.

In this embodiment, in ag state where the glass plate 10 is placed horizontally, the edge surface 14 is irradiated with the laser beam, and the edge surface 14 is processed into a target shape as the laser beam L is moved relative to the edge surface 14 in the circumferential direction of the disk-shaped glass plate 10. The edge surface 14 may be processed to a target shape by irradiating the edge surface 14 with the laser beam L in a state where the main surfaces 12 of the glass plate 10 are placed vertically. The orientation of the arrangement of the glass plate 10 is not particularly limited. The edge surface 14 is irradiated with the laser beam L from the normal direction of the edge surface 14, for example. The laser beam IL emitted from a laser source 20, which will be described later, is converted into parallel light through an optical system 22 that includes a collimator and the like, the laser beam L is focused through a focusing lens 24, and the edge surface 14 is irradiated with the expanding laser beam L.

On the other hand, the glass plate 10 is rotated at a constant speed with the central position of the glass plate 10 set as the center of rotation. In this manner, the entire circumference of the edge surface 14 of the glass plate 10 is irradiated with the laser beam L while the laser beam IL and the edge surface 14 are moved relative to each other in the circumferential direction of the disk-shaped glass plate 10. The irradiation position of the laser beam L may be moved along the edge surface 14 instead of rotating the glass plate 10, and the laser beam L and the edge surface 14 need only be moved relative to each other.

Here, the edge surface 14 may be irradiated with the laser beam L from a normal direction at a position on the edge surface 14 to be irradiated, or may be inclined from the normal direction. The inclination angle may be set to 45 degrees or less from the normal direction, for example. The normal direction includes not only a perfectly normal direction (at an inclination angle of 0 degrees) but also a normal direction in the range where the inclination angle to the normal direction is within 10 degrees, which is an allowable range.

In the shape processing using the laser beam L, the glass plate 10 is preheated at a high temperature, and the laser beam L and the edge surface 14 are moved relative to each other in the circumferential direction of the disk-shaped glass plate 10. At this time, in order to irradiate the entire circumference of the edge surface 14 of the glass plate 10 with the laser beam L, in general, the glass plate 10 is placed on and fixed to a support base, or the glass plate 10 is held by a support tool and fixed thereto. However, because the heat of the glass plate 10 that reached a high temperature is released from the support base or the support tool, the glass plate 10 cannot be substantially uniformly heated. As a result, the temperature history varies in the main surface 12 of the glass plate 10, and a strain distribution is likely to occur in the glass plate 10.

Conventional shape processing using the laser beam L will be specifically described. The size of the support base or the support tool and the position of contact with the main surface are adjusted such that the laser beam L is applied to the entire edge surface 14 of the glass plate 10 near the irradiation position of the laser beam L in the thickness direction of the glass plate 10. In other words, the size of the support base or the support tool and the position of contact with the main surface 12 of the glass plate 10 are adjusted such that the outer circumferential edge surface and/or the inner circumferential edge surface of the glass plate 10 is exposed to the outside over the entire circumference of the glass plate 10. At this time, the contact position on the main surface 12 of the glass plate 10 that comes into contact with the support base or the support tool is located in a region on the main surface 12 located inside by a predetermined distance or more from the outer circumferential edge surface and outside by a predetermined distance or more from the inner circumferential edge surface. In other words, the above-described contact position refers to a portion (also referred to as a "middle circumferential portion") other than the outermost circumferential portion and the innermost circumferential portion on the main surface 12 of the glass plate 10.

The above-described predetermined distance can be set to 5 mm or more in consideration of variation in the position when the glass plate 10 is placed on the support base or the support tool, for example. If the predetermined distance is 5 mm, the middle circumferential portion refers to a region on the main surface 12 that is located 5 mm or more away from the outer circumferential edge surface and 5 mm or more away from the inner circumferential edge surface.

The glass plate 10 is placed on the support base or the support tool, in general, the edge surface 14 of the glass plate 10 is then irradiated with the laser beam L while heating the glass plate 10. However, conventionally, a portion of the heat of the heated glass plate 10 is released through the support base or the support tool, and thus the main surface 12 of the glass plate 10 cannot be substantially uniformly heated, and a temperature distribution occurs. As a result, the temperature history varies depending on the position in the main surface 12 of the glass plate 10, and thus abnormal strain is likely to occur in the middle circumferential portion of the glass plate 10, and a strain distribution is likely to occur.

Furthermore, according to studies conducted by the inventors, it was found that strain in the glass plate 10 caused by the contact with the support base or the support tool occurs with a certain extent in the middle circumferential portion regardless of the length of the predetermined distance from the edge surface 14. Thus, it was found that it is possible to detect strain in the middle circumferential portion located about 25% or more away from the inner circumferential end and the outer circumferential end where the inner circumferential end is 0% and the outer circumferential end is 100% in the radial direction of the main surface 12 of the glass plate 10. Therefore, a strain distribution can be evaluated by measuring strain at multiple positions in the middle circumferential portion located 25%, 50%, and 75% in the radial direction away from the inner circumferential end of the glass plate 10, for example. In the case of using an annular glass piece with an outer diameter of 95 mm and an inner diameter of 25 mm as a glass plate, for example, these three radial measurement positions are located 8.75 mm, 17.5 mm, and 26.25 mm from the inner circumferential end (the distances from the center are respectively 21.25 mm, 30 mm, and 38.75 mm).

On the other hand, in this embodiment, as shown in FIG. 1, the glass plate 10 and the placement surface 18 are brought into a non-contact state by floating the glass plate 10 above the placement surface 18 of the base, and the edge surface of the glass plate 10 is irradiated with the laser beam L while heating the glass plate 10 using a method in which the placement surface 18 does not conic into contact with the glass plate 10. The heating apparatus is not shown in the drawings. The glass plate 10 can be heated in a non-contact manner through heat radiation using a heater or the like or heating in a heat transfer furnace, for example. Alternatively, the entire glass plate 10 is heated using a heating laser beam, which is different from the laser beam L. The diameter of an irradiation spot of the heating laser beam is not particularly limited, and is preferably set to ¾ or more of the diameter (outer diameter) of the glass plate 10 because the heating efficiency can be increased with ease. Also, the heating laser beam may be configured to scan the entire main surface 12 of the glass plate 10 or a plurality of laser beams may be used. A $CO_2$ laser can be used as this heating laser beam, for example. In general, because 99% or more of the $CO_2$ laser beam is absorbed by glass, and thus the glass plate can be efficiently heated.

Doing this makes it possible to prevent heat from flowing out from the glass plate 10 through the portion of contact with the support base or the support tool, and thus the glass plate 10 can be uniformly heated with ease. As a result, because the middle circumferential portion of the glass plate 10 is likely to have the same heat history, it is possible to suppress the occurrence of abnormal strain in the middle circumferential portion.

When the edge surface of the glass plate 10 is to be irradiated with the laser beam L in this manner, the glass plate 10 is floated above the placement surface 18 so that the glass plate 10 and the placement surface 18 are in a non-contact state, and the edge surface of the glass plate 10 is irradiated with the laser beam L while heating the glass plate 10 using the method in which the placement surface 18 does not come into contact with the glass plate 10. At this time, the laser beam L is moved relative to the edge surface 14 in the circumferential direction of the disk-shaped glass plate 10. Accordingly, the edge surface 14 can be processed into a target shape.

The glass plate 10 can be floated by applying a floating force or a suction force to the glass plate 10 using a known technique in which ultrasonic waves, gas pressure, electrostatic force, or the like is used. A floating height H is not particularly limited as long as it is stable, and may be 0.1 mm or more, and more preferably 0.5 to 5 mm, for example. It is possible, to suppress the outflow of heat from the support base or the support tool due to the glass plate 10 being floated.

If ultrasonic waves are used, the density of gas resulting from standing waves is used, or acoustic radiation pressure is used, for example. When a vibrator, which is a sound source, and a reflector are disposed parallel to each other so as to form a sound field of standing waves, a floating force is generated due to the difference in density at the position of a node of the standing waves where the atmospheric pressure decreases, and an object can be floated at this position. However, this floating force is small, and thus it is preferable to utilize the floating force caused by acoustic radiation pressure. When a target object is placed in parallel on a vibration plate in a flexural vibration mode or a longitudinal vibration mode, the acoustic radiation pressure acts on the bottom surface of the target object that blocks the propagation of acoustic waves, thus generating a floating force. The floating height caused by such a floating force may be set to 0.1 mm or more, and more preferably 0.5 to 5 mm, for example. It is possible to suppress the outflow of heat through the support base or the support tool due to the glass plate 10 being floated.

Also, an ultrasonic wave generation surface is located so as to face the main surface 12 of the glass plate 10, and a thin compressed air film is formed on the ultrasonic wave generation surface so as to generate a repulsive force to separate the ultrasonic wave generation surface and the glass plate 10 from each other and realize a state where the glass plate 10 is not in contact with the ultrasonic wave generation surface. On the other hand, the glass plate 10 can be fixed to the ultrasonic wave generation surface in a state where the glass plate 10 is separated from the ultrasonic wave generation surface, that is, the glass plate 10 can be chucked in a non-contact state, using a negative pressure generated through suction of air from the ultrasonic wave generation surface as a suction force. Therefore, it is possible to easily control the rotation of the glass plate 10 by rotating the ultrasonic wave generation surface. In some cases, it is possible to fix (chuck) the glass plate 10 onto the ultrasonic wave generation surface using only ultrasonic waves without using a suction force, in a state where the glass plate 10 is not in contact with the base.

In this case, it is preferable to control ultrasonic waves to keep the floating height constant such that the floating height does not change during processing.

If gas pressure is used, it is possible to use a non-contact chuck using the Bernoulli effect or the like. A cylindrical chamber is provided above the base so as to face the base, a high-speed swirl flow (swirl flow) is generated in this chamber, and the target object can be floated above the base through suction of the target object using a negative pressure generated at the central portion of the swirl and a positive pressure generated by discharged gas flowing from the cylindrical chamber to the outside, for example, if gas pressure is used, the force to fix the glass plate 10 in a non-contact manner is relatively strong, and thus it is possible to easily control the rotation of the glass plate 10 by rotating the base including a chuck portion. It is also possible to charge the target object and float the target object by an electrostatic force. Such a floating method may be used alone, and the ultrasonic waves, gas pressure, electrostatic force, and the like may be used in combination of two or more.

The disk-shaped glass plate 10 is floated above the base in this manner, and the edge surface 14 is processed to a target shape by irradiating the edge surface of the glass plate 10 with the laser beam L while contactlessly heating the glass plate 10 in a state where the glass plate 10 is floated, and moving the laser beam L relative to the edge surface 14 in the circumferential direction of the glass plate 10. Due to the glass plate 10 being irradiated with the laser beam L, the shape of the edge surface 14 of the glass plate 10 can have a target shape without varying from the target shape, and the chamfered surfaces can be formed. Furthermore, it is possible to suppress variation in in-plane strain (retardation values) in the main surface 12 of the glass plate 10, that is, it is possible to suppress a strain distribution. The difference between the maximum value and the minimum value of the retardation values in the in-plane middle circumferential portion of the glass plate 10 that has been heated and subjected to shape processing through irradiation with the laser beam L in a state where the glass plate 10 is placed on the placement surface 18 of the base is more than 30 nm, for example, whereas if the glass plate 10 has been heated and subjected to shape processing through irradiation with the laser beam L in a state where the glass plate 10 is floated above the placement surface 18 in this embodiment, the above-described difference between the retardation values of the glass plate 10 can be 30 nm or less, and preferably 20 nm or less. Also, the surface of the edge surface 14 can be smoothened. The difference between the retardation values in the in-plane middle circumferential portion of the glass plate 10 is more preferably 10 nm or less, and even more preferably 5 nm or less. If the difference between the retardation values is large, there is a risk that the glass plate may be likely to warp or crack during a heating process in the subsequent steps. In particular, if the glass plate is to ultimately be a magnetic-disk glass substrate, the glass plate is heated to a high temperature in the subsequent film formation step of forming a magnetic film on the surface of the substrate, and thus it is important to reduce the above-described difference between the retardation values.

According to an embodiment, during preheating of the glass plate 10 performed before shape processing using the laser beam L, the glass plate is preferably contactlessly heated such that the temperature difference in the in-plane middle circumferential portion of the main surface 12 is 50° C. or less. Accordingly, it is possible to form a uniform shape on the circumferences of the chamfered surfaces, and to reduce the difference between the retardation values. It is preferable that the glass plate is contactlessly heated such that the above-described temperature difference is 20° C. or less.

The following irradiation conditions may be used in order to form the edge surface 14 into a target shape through irradiation with such a laser beam L.

It is preferable that the cross-sectional intensity distribution of the laser beam L with which the edge surface 14 is irradiated is a single mode. That is to say, the cross-sectional intensity distribution of the laser beam L is a Gaussian distribution. It is preferable to use conditions in which W1>Th holds true and Pd×Th is in a range of 0.8 to 3.5 [W/mm] in irradiation with the laser beam L when, as shown in FIG. 2, the width of the luminous flux of the laser beam L in the thickness direction of the glass plate 10 at an irradiation position of the edge surface 14 is W1 [mm], and as shown in FIGS. 1 and 3, the thickness of the glass plate 10 is Th [mm], and the power density of the laser beam L is Pd [W/mm²]. Here, the luminous flux of the laser beam L is emitted so as to protrude on both sides in the thickness direction of the glass plate 10. Also, chamfering can be evenly performed on both sides in the thickness direction of the glass plate 10 by making the widths of the protrusions of the laser beam L on both sides of the edge surface 14 equal to each other, and the shapes of two chamfered surfaces 14c can be made the same as each other. The power density Pd is a value obtained by dividing the total power P [W] of the laser beam L by the area of the luminous flux in a portion irradiated with the laser beam L. If the luminous flux of the laser beam L forms an elliptical shape (see FIG. 2) having a short axis radius of W1/2 and a long axis radius of W2/2, the power density Pd is defined as 4×P/W1/W2/π [W/mm²] (π indicates pi).

Here, although a $CO_2$ laser beam is used as one example of the laser beam the laser beam L is not limited to the $CO_2$ laser beam as long as it has an oscillation wavelength that is absorbed by glass. Examples of the laser beam L include CO lasers (having an oscillation wavelength of about 5 μm and 10.6 μm) and Er-YAG lasers (having an oscillation wavelength of about 2.94 μm). If $CO_2$ laser beam is used, it is preferable that the wavelength thereof is set to 3 μm or more. Also, it is more preferable that the wavelength thereof is set to 11 μm or less. If the wavelength of a laser beam is shorter than 3 μm, there are cases where glass is unlikely to absorb the laser beam L, and the edge surface 14 of the glass plate 10 cannot be sufficiently heated. Also, if the wavelength thereof is longer than 11 μm, it may be difficult to obtain a laser device. Note that the oscillation form of a laser source 20 is not particularly limited, and any one of continuous oscillation light (CW light), pulse oscillation light, and light obtained by modulating continuous oscillation light may be used. However, in the case of pulse oscillation light and modulated light of continuous oscillation light, there is a concern that, if the relative moving speed of the laser beam L is high, the shape of the chamfered surfaces 14c may be uneven in the moving direction. In such a case, oscillation and modulation frequencies are preferably 1 kHz or more, more preferably 5 kHz or more, and even more preferably 10 kHz or more.

The width W1 and the length W2, which will be described later, of the luminous flux can be set by adjusting the position where the glass plate 10 is irradiated with the laser beam L, using two cylindrical lenses, for example. Also, the width W1 can be obtained from a beam profiler, and the length W2 can be obtained from the shape of a beam obtained by the beam profiler and a diameter D of a glass plate.

It is possible to sufficiently irradiate a side end of the edge surface 14 on the main surface 12 side (both sides in the thickness direction) with the laser beam L by making the width W1 of the laser beam L larger than the thickness Th of the glass plate 10, and to form a chamfered surface by softening and melting a portion of the glass plate 10 using heat.

If a ratio Th/W1 of the width W1 of the laser beam L relative to the thickness Th of the glass plate 10 is excessively increased (i.e., Th/W1 is excessively close to 1), the edge portion of the glass plate 10 is poorly heated and the central portion of the edge surface 14 of the glass plate 10 in the thickness direction is strongly heated due to the influence of the laser beam in a range with a steep slope in laser intensity distribution. Therefore, it is not preferable to excessively increase the ratio Th/W1 because the edge surface is likely to have a spherical shape, which will be described later. Also, if Th/W1 is excessively reduced, there are cases where it is difficult to form a chamfered surface 14c because there is too little heating of the edge surface 14 by the laser beam L. From the above-described viewpoint, it is preferable that Th/W1 is in a range of 0.3 to 0.9.

Incidentally, if the power density Pd of the laser beam L is excessively low, the edge surface 14 is not sufficiently heated, and a chamfered surface is not formed. On the other hand, if the power density Pd is excessively high, the entire edge surface 14 is rounded into a spherical shape due to heat, and the thickness of the spherical shape in the thickness direction is larger than the thickness Th of the glass plate 10.

Therefore, it is preferable that the irradiation conditions are set such that W1>Th holds true and Pd×Th is in a range of 0.8 to 3.5 [W/mm]. Pd×Th is preferably 3.0 [W/mm] or less, more preferably in a range of 1.0 to 2.8 and even more preferably in a range of 1.2 to 2.3 [W/mm].

Because Pd×Th is set to a range of 0.8 to 3.5 [W/mm], if the thickness Th of the glass plate 10 is reduced and the irradiation conditions Pd×Th are out of a range of 0.8 to 3.5 [W/mm], the power density Pd is increased. By increasing the power density Pd, a portion by which the area of the glass plate 10 irradiated with the laser beam L is reduced can be compensated for by the power density Pd, and a chamfered surface 14c can be formed.

Note that, in order to form chamfered surfaces having the same shape on both sides in the thickness direction of the glass plate 10 simultaneously, the central position of luminous flux in the width direction of the laser beam L is preferably made to coincide with the position of the center of the glass plate 10 in the thickness direction of the glass plate 10.

As a result of using such conditions, the edge surface 14 of the glass plate 10 can have a target shape without varying from the target shape, and the chamfered surface 14c can be formed. Also, the surface of the edge surface 14 can be smoothened.

Although the chamfered surfaces 14c can be formed with the range of the value of Pd×Th being limited as described above, the chamfered surfaces 14c can be efficiently formed on the edge surface 14 of the glass plate 10 by irradiating the edge surface 14 with the laser beam L with the value of Pd×Th and the value of the moving speed being controlled. Also, it is possible to form not only the chamfered surfaces 14c but also a surface that is perpendicular to the main surfaces 12 of the glass plate 10, i.e., a side wall surface 14t, by controlling the value of Pd×Th and the value of the moving speed more specifically. Accordingly, the shape of the edge surface 14 can be a target shape without varying from the target shape. Also, the surface of the edge surface 14 can be smoothened. In this case, the edge surface 14 of the glass plate 10 before the chamfered surfaces 14c are formed has a surface that is perpendicular to the main surfaces 12 at least at the central portion in the thickness direction of the glass plate 10. It is possible to chamfer edge portions (the border portions between the main surfaces 12 and the edge surface 14) on both sides of the edge surface 14 of the glass plate 10 in the thickness direction into a round shape, by softening and/or melting the edge portions of the edge surface 14, for example, corner portions that are bent at a right angle, by irradiating the edge surface 14 of the glass plate 10 with the laser beam L, and to form a surface (the side wall surface 14*t*) that is sandwiched between the chamfered surfaces on the two sides in the thickness direction of the glass plate 10 and is perpendicular to the main surfaces 12 on the chamfered edge surface 14. In particular, the edge surface 14 preferably includes a surface (a side wall surface 14*t*) that is perpendicular to the main surfaces 12 and whose length is $\frac{1}{10}$ or more of the thickness Th, and the chamfered surface 14*c*. It is more preferable that a length T (see FIG. 4) of the above-described perpendicular surface (the side wall surface 14*t*) is $\frac{1}{5}$ or more of the thickness Th.

According to an embodiment, the perpendicular surface (the side wall surface 14*t*) formed through irradiation with the laser beam L together with the chamfered surfaces 14*c* is different from the surface of the edge surface 14 that is perpendicular to the main surfaces 12 before the chamfered surfaces 14*c* are formed through irradiation with the laser beam L, and is a newly formed surface, and the surface roughness Rz and the arithmetic average roughness Ra thereof are reduced due to irradiation with the laser beam L. Also, the distance in the radial direction from the central position of the disk-shaped glass plate 10 to the perpendicular surface (the side wall surface 14*t*) is increased.

Note that the surface (the side wall surface 14*t*) that is perpendicular to the main surfaces 12 refers to a surface in a range of 90 degrees±2 degrees relative to the main surfaces 12 as an allowable range.

A method for manufacturing a glass plate including the above-described shape processing performed on the glass plate 10 will be described using the following method for manufacturing a magnetic-disk glass substrate.

Similarly to the glass plate 10 shown in FIG. 1, a magnetic-disk glass substrate is also a disk-shaped thin glass substrate provided with a circular hole. Although there is no limitation on the size of a magnetic-disk glass substrate, a magnetic-disk glass substrate has a nominal diameter of 2.5 inches or 3.5 inches, for example. In the case of a magnetic-disk glass substrate with a nominal diameter of 3.5 inches, the outer diameter (nominal value) thereof is in a range of 95 mm to 97 mm, for example. In the case of a magnetic-disk glass substrate with a nominal diameter of 2.5 inches, the outer diameter (nominal value) thereof is in a range of 65 mm to 67 mm, for example. The thickness of the magnetic-disk glass substrate is 0.20 mm to 0.65 mm, for example, preferably 0.30 mm to 0.65 mm, and preferably 0.30 mm to 0.53 mm. A magnetic disk can be produced by forming a magnetic film on a main surface of this glass substrate.

The shape of the edge surface of the glass substrate is similar to that of the outer circumferential end of the glass plate 10 shown in FIG. 4. The glass plate 10 includes a pair of main surfaces 12 and 12, a side wall surface 14*t* formed on the edge surface 14 of the outer circumferential edge portion, and the chamfered surfaces 14*c* and 14*c* are respectively interposed between the side wall surface 14*t* and the main surfaces 12 and 12, and, similarly to the edge surface 14 of the outer circumferential edge portion, an edge surface of the inner circumferential edge portion thereof includes a side wall surface (not shown) and chamfered surfaces (not shown) respectively interposed between this side wall surface and the main surfaces 12 and 12. This shape is a target shape in shape processing performed on the edge surface 14 using the laser beam L. The target shape will be described below.

The side wall surface 14*t* is a surface that extends in a direction that is substantially orthogonal to the main surfaces

12. "Substantially orthogonal" refers to an inclination angle of the side wall surface 14*t* relative to a main surface 12 being in a range of 88 degrees to 92 degrees. The chamfered surfaces 14*c* are smoothly connected to the main surfaces 12, extending toward the side wad surface 14*t*. The chamfered surfaces 14*c* form a curved shape that protrudes outward, and are smoothly connected to the side wall surface 14*t*. Therefore, a length C [mm] of a chamfered surface 14*c* shown in FIG. 4 in the radial direction of the corresponding main surface 12 refers to the length of a portion inclined at an inclination angle of more than 2 degrees and less than 88 degrees relative to the main surface 12.

A curved shape of the chamfered surface 14*c* obtained when cutting the chamfered surface 14*c* along the radial direction and the thickness direction of the main surface 12 is a shape in which the inclination angle of the chamfered surface 14*c* relative to the main surface 12 continuously increases toward the outer side in a radial direction.

When such a glass substrate is produced, it is possible to cut a glass blank whose size is slightly larger than that of the glass plate 10 out from a large glass plate that has been prepared in advance, using a laser beam, for example.

Large sheet glass prior to a glass blank being cut out therefrom is a glass plate with a constant thickness produced using a floating method or a down draw method, for example. Alternatively, sheet glass may be a glass plate obtained by press-molding a lump of glass using a mold. The thickness of the glass plate is larger than a target thickness of a magnetic-disk glass substrate, which is to the final product, by an amount of machining allowance from grinding and polishing, and the thickness of the glass plate is larger by an amount of about several micrometers to several hundreds of micrometers, for example.

Note that, in addition to a method for cutting out a glass blank using a laser beam, a method may be used in which a notch line is formed on a glass plate using a scriber, and the glass plate is cut by making cracks along the notch line through heating or the like as in a conventional manner. Also, a glass blank may be cut out through wet etching using an etching liquid such as hydrofluoric acid.

If processing for cutting a glass blank out from large sheet glass is performed using a laser beam, a solid-state laser such as a YAG laser or Nd: YAG laser is used as a laser beam, for example. Therefore, the wavelength of the laser beam is in a range of 1030 nm to 1070 nm, for example. In this case, the laser beam is a pulse laser, for example, and the pulse width is set to $10 \times 10^{-12}$ seconds or less (10 picoseconds or less), for example. Light energy of the laser beam can be adjusted as appropriate according to the pulse width and the repetition frequency of the pulse width. Holes can be intermittently formed through irradiation with this laser beam at discrete positions along a boundary line to be cut.

Then, an outer portion and an inner portion of the glass plate provided with the holes where the above-described boundary line is the boundary are separated from each other by increasing the temperature of the Outer portion to be higher than that of the inner portion, or heating the outer portion.

Alternatively, the glass plate may be continuously irradiated with another type of laser beam along the boundary line such that holes, which are formed discretely along the boundary line to be cut, through irradiation with the laser, are linearly continuous. It is possible to use a $CO_2$ laser as the other type of laser beam, for example. It is possible to form linear holes using this laser beam so as to connect intermittently formed holes. In this case, as needed, the outer portion and the inner portion of the glass plate where the above-described boundary line is the boundary are separated from each other by increasing the temperature of the outer portion to be higher than that of the inner portion, or heating the outer portion. It is possible to cut out a circular plate-shaped glass blank from sheet glass in this manner. The surface roughness Rz of an edge surface of the circular plate-shaped glass blank formed in this manner is in a range of 1 to 10 μm, for example, and the arithmetic average roughness Ra thereof is in a range of 0.1 to 1 μm, for example.

Furthermore, in order to form a concentric circular hole in the cutout disk-shaped glass blank using a scriber, similarly to the above-described method, the circular hole is formed through irradiation with a laser beam, or through etching. The glass blank provided with the circular hole serves as a glass blank for producing a magnetic-disk glass substrate.

Shape processing is performed using the laser beam L in order to form the chamfered surface 14c on the edge surface 14 (an edge surface of the outer circumferential edge portion and an edge surface of the inner circumferential edge portion) of the disk-shaped glass plate 10 obtained in this manner and such as that shown in FIG. 1. As described above, in the shape processing using the laser beam L, the shape of the edge surface 14 is processed into a target shape by irradiating the edge surface 14 of the glass plate 10 (glass blank), which is floated above the placement surface 18 using a known technique and is heated in the floated state, with the laser beam L (from the normal direction of the edge surface 14, for example) while moving the edge surface 14 and the laser beam L relative to each other in the circumferential direction of the disk-shaped glass plate 10. The laser beam L is preferably a laser beam having a cross-sectional intensity distribution of a single mode, and irradiation conditions of the laser L are preferably set such that the width W1> the thickness Th holds true and Pd×Th is in a range of 0.8 to 3.5 [W/mm²]. Accordingly, the shape of the edge surface 14 of the glass plate 10 can have a target shape without varying from the target shape, and the chamfered surfaces can be formed.

Also, the edge surface 14 is irradiated with a laser beam L with the value of Pd×Th and the value of the moving speed being controlled, in order to chamfer edge portions of the edge surface 14 of the pre-chamfering glass plate 10 that has a surface that is perpendicular to the main surfaces 12 at least in the central portion in the thickness direction by softening and/or melting the edge portions of the edge surface 14 of the glass plate 10 by irradiating the edge surface 14 of the glass plate 10 with the laser beam L such that the edge portions have a round shape, and, in order to form a surface (the side wall surface 14t) that is perpendicular to the main surfaces 12 of the glass plate 10 on the chamfered edge surface 14 in addition to the edge surface 14 being chamfered. Accordingly, the shape of the edge surface 14 of the glass plate 10 can have a target shape without varying from the target shape, and it is possible to form the surface (the side wall surface 14t) that is perpendicular to the main surfaces 12 and the chamfered surfaces 14c.

Figures 5A, 5B, 5C:
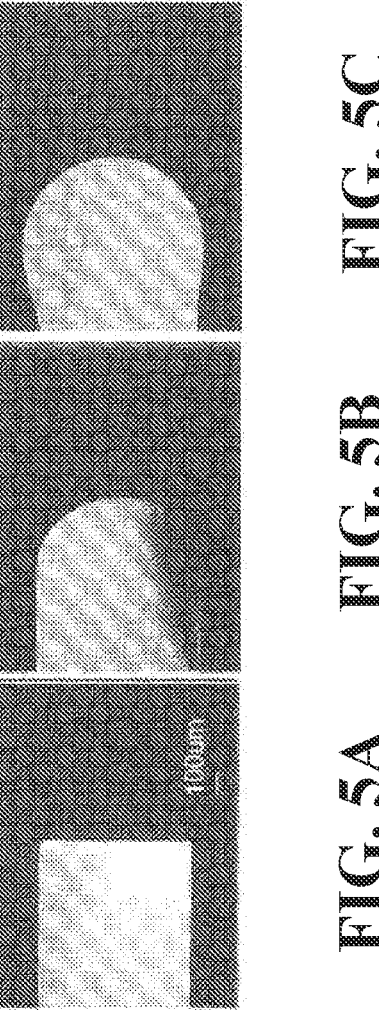
FIGS. 5A to 5C are diagrams illustrating differences between shapes of edge surfaces depending on differences in laser irradiation conditions.

FIGS. 5A to 5C are diagrams illustrating differences between shapes of edge surfaces 14 depending on differences in irradiation conditions of the laser beam L. FIGS. 5A to 5C show examples of the shapes of the edge surfaces 14 obtained when, in the irradiation conditions, the thickness Th was fixed at 0.7 mm, the width W1 was fixed at 1.0 mm, Th/W1 was fixed at 0.7, the length W2 was fixed at 10 mm, the moving speed at an irradiation position was fixed at 2 mm/s, and Pd×Tb was changed by changing the power density Pd. Note that a glass blank that has a glass transition temperature Tg of 500° C. and a diameter of 95 mm and whose edge surface 14 is perpendicular to the main surfaces 12 was used as a pre-processing glass plate. The edge surface 14 had a surface roughness Rz of 5 μm and an arithmetic average roughness Ra of 0.5 μm. An outer circumferential edge surface of the glass blank was irradiated with the laser beam L.

FIG. 5A shows an example in which the glass blank was not irradiated with the laser beam L, that is, Pd was equal to 0 [W/mm²]. FIG. 5B shows the shape of the edge surface 14 under the irradiation condition where Pd was equal to 1.9 [W/mm²], and FIG. 5C shows the shape of the edge surface 14 under the irradiation condition where Pd was equal to 4.0 [W/mm²].

A portion of the edge surface 14 shown in FIG. 5C has a spherical shape, and the glass plate 10 has a smaller outer diameter, and thus, the length of the glass plate 10 in the thickness direction at the edge surface 14 is longer than the thickness of the glass plate 10 (the length between the main surfaces), and thus, the glass plate has an unfavorable shape as a glass substrate having a fixed thickness.

Therefore, it is preferable to set the irradiation conditions of the laser beam L such that the side wall surface 14t that is substantially orthogonal to the main surfaces 12, and the chamfered surfaces 14c connecting the ends on both sides of the side wall surface 14t and the ends of the main surfaces each other are formed on the edge surface 14. It is preferable to set the range of the power density Pd to 1.2 [W/min²] to 3.0 [W/mm²], for example, so that the outer diameter of the glass plate 10 is reduced or the length of the above-spherical shape in the thickness direction is not larger than the thickness of the glass plate 10 (the length between the main surfaces).

According to an embodiment, the irradiation conditions Pd×Th are preferably set such that as the target shape of the edge surface 14, a ratio C/Th of the length C of the chamfered surface 14c extending in the radial direction of the main surface 12, relative to the thickness Th is in a range of 0.1 to 0.7. The function of the chamfered surface 14c provided with no corner portions can be exerted on the portion where the edge surface 14 and the main surfaces 12 are connected to each other by setting C/Th to 0.1 to 0.7. Also, if C/Th is less than 0.1, there is a risk that the chamfered surfaces 14c may not be sufficiently formed, and edges may be likely to be chipped in the subsequent film formation process or the like. Also, if C/Th exceeds 0.7, there is a risk that the data recording area on the main surfaces 12 may be reduced. Therefore, it is possible to adjust C/Th by adjusting Pd×Th in a range of 1.2 to 2.3 [W/mm]. It is more preferable to set C/Th to 0.25 to 0.5.

According to an embodiment, it is preferable to set irradiation conditions such that as the target shape of the edge surface 14, the ratio T/Th of the length T [mm] of the side wall surface 14t along the thickness direction relative to the thickness Th is in a range of 0.1 to 0.8. If T/Th is less than 0.1, there is a risk that the side wall surface 14t may not be sufficiently formed, and it may be difficult to measure the outer diameter or the inner diameter of the glass plate 10, and thus measurement variation may occur, making production control difficult. Also, if C/Th exceeds 0.8, there is a risk that the chamfered surfaces 14c may not be sufficiently formed, and edges may be likely to be chipped in the subsequent film formation process or the like.

According to an embodiment, the arithmetic average roughness Ra (JIS B0601: 2001) of the edge surface 14 (the chamfered surfaces 14c and the side wall surface 14t) formed by the laser beam L is preferably 0.02 μm or less.

Furthermore, the surface roughness Rz (JIS B0601: 2001) thereof is preferably 0.3 μm or less, and more preferably 0.2 μm or less, and even more preferably 0.02 μm or less. The surface roughness Rz and the arithmetic average roughness Ra can be measured using a laser optical microscope, for example. It is possible to smoothen the chamfered surfaces 14$c$ and the side wall surface 14$t$ by irradiating the edge surface 14 with the laser beam L under the above-described irradiation conditions.

Also, as shown in FIG. 1, when shape processing is performed by moving the position irradiated with the laser beams L relative to the disk-shaped glass plate 10 along the circumferential direction of the glass plate 10, it is preferable to effectively heat the edge surface 14 using the laser beam L such that the center point in the circumferential direction at the irradiation position has the maximum temperature by increasing the length W2 (see FIG. 2) in the circumferential direction of the disk shape of the glass plate 10 to some extent and gradually increasing the temperature of the edge surface 14 through heating with the laser beam L. As a result, the moving speed can be increased at the position irradiated with the laser beam L, and thus the processing time can be shortened. According to an embodiment, it is preferable that the ratio W2/D of the length W2 of the luminous flux of the laser beam L with which the edge surface 14 is irradiated, in the circumferential direction of the disk shape of the glass plate 10, relative to the diameter D of the glass plate 10 is in a range of 0.03 to 0.2. If W2/D is less than 0.03, the length W2 is relatively short, and thus the temperature of the edge surface 14 cannot be gradually increased sufficiently. If W2/D exceeds 0.2, the length W2 is relatively long. Therefore, in this case, the irradiation position where the glass plate 10 is irradiated with the laser beam L (the position of the laser beam L in the irradiation direction) greatly changes depending on the curvature of the glass plate 10, and as a result, the luminous flux spreads and it is difficult to efficiently perform heating in the circumferential direction. According to an embodiment, as shown in FIG. 2, the luminous flux of the laser beam L with which the edge surface 14 is irradiated preferably has an elliptical shape.

Note that, due to the edge surface 14 being irradiated with the laser beam L, if the power density Pd is gradually increased, the diameter D of the glass plate 10 increases by several tens of micrometers to several hundreds of micrometers because the shape of the edge surface 14 is rounded, and if the power density Pd is further increased, the rounding range is increased, and the length in the thickness direction increases to form a spherical shape, and accordingly, the diameter D of the glass plate 10 decreases. That is, the diameter D of the glass plate 10 after being subjected to shape processing changes depending on the magnitude of the power density Pd. The example shown in FIG. 5C is an example in which the edge surface 14 has a spherical shape due to an excessive increase in the power density Pd and the edge surface 14 being overheated, and thus the diameter of the glass plate 10 is shortened. The glass plate 10 such as that shown in FIG. 5C is not preferable because the outer diameter thereof is smaller than the target diameter of the glass plate 10. Furthermore, it is not preferable to overheat the edge surface 14 because the spherical shape is also likely to vary, and the diameter of the glass plate 10 cannot be made uniform. Thus, it is preferable that the power density Pd is set such that the diameter of the glass plate 10 formed through irradiation with the laser beam L is larger than the diameter of the glass plate 10 before being irradiated with the laser beam L.

It is preferable that the moving speed at which the laser beam L moves along the edge surface 14 is in a range of 0.7 to 140 min/s. Here, the moving speed refers to a moving speed relative to the edge surface 14, From the viewpoint of processing efficiency, it is preferable that shape processing using the laser beam IL is complete when the laser beam L makes one rotation around the glass plate 10. Here, if the moving speed exceeds 140 mm/s, it may be difficult to estimate the timing at which the shape processing will be complete, and it may be difficult to match the start point and the end point of the shape processing. Also, if the moving speed is lower than 0.7 mm/s, it is difficult to control the shape of the edge surface 14 because the shape of the edge surface 14 will vary due to a slight change in Pd×Th. Even if a shape in which the side wall surface 14$t$ and the chamfered surfaces 14$c$ shown in FIG. 4 are provided is obtained, the edge surface 14 is likely to be overheated only by slightly increasing Pd×Th, and to have a shape such as that shown in FIG. 5C, and thus stable production is unlikely to be achieved, for example. In this regard, it is preferable that the moving speed is in a range of 0.7 to 140 mm/s.

Note that it is more preferable that the moving speed is in a range of 20 to 140 mm/s. If the moving speed is 20 mm/s or more, a change in the shape of the edge surface 14 with respect, to a change in Pd×Th is relatively smooth, and productivity is improved due to the processing time being shortened. Therefore, it is more preferable that the moving speed is in a range of 20 to 100 mm/s.

Note that it is preferable to set the temperature of the glass plate 10 higher than room temperature during shape processing for performing chamfering using the laser beam L in order to promote the formation of chamfered surfaces using the laser beam L. At this time, it is preferable that the temperature thereof is Tg−50° C. (Tg indicates the glass transition temperature of the glass plate 10) or lower. Furthermore, it is more preferable to set the temperature of the glass plate 10 when performing shape processing for chamfering to a range of 150 to 400° C. If the temperature of the glass plate 10 is less than 150° C., there are cases where the chamfered surfaces 14$c$ cannot be sufficiently formed. If the temperature of the glass plate 10 is higher than 400° C., there are cases where the glass plate 10 deforms and it is difficult to irradiate the edge surface 14 with the laser beam L. The glass plate 10 can be heated before this chamfering processing is carried out, or the glass plate 10 can be heated while this chamfering processing is being performed, as a method for heating the glass plate 10, for example. Note that, if the glass plate 10 is heated while performing chamfering through irradiation with the laser beam L, it is difficult to control temperature due to a synergistic effect with the heating by the laser beam L, and thus there are cases where the shape of the edge surface 14 may vary greatly. Therefore, if the glass plate 10 is to be heated, it is preferable to heat the glass plate 10 prior to chamfering through irradiation with the laser beam L. In this case, it is preferable to keep the glass plate 10 warm as appropriate during chamfering.

An edge surface of the inner circumferential edge portion of the glass plate 10 whose edge surface 14 has been subjected to shape processing in this manner is also subjected to shape processing using the laser beam L, and then various processes are performed on the glass plate 10 such that the glass plate 10 has properties suitable for the final product.

Edge surface polishing processing is performed on the edge surface 14 subjected to the shape processing, for example. It is possible to reduce the surface roughness of the chamfered surface 14$c$ and the side wall surface 14$t$ through the above-described shape processing, and thus to make the amount of machining allowance in edge surface polishing processing smaller than in processing on the chamfered surfaces 14c using a formed grindstone in a conventional manner, and it is possible to improve production costs and production efficiency. According to an embodiment, edge surface polishing processing need not be performed at all.

If a magnetic-disk glass substrate is to be produced from the glass plate 10, the main surfaces 12 of the glass plate 10 are then ground and polished using the glass plate 10 as an intermediate glass plate before the glass plate 10 becomes a magnetic-disk glass substrate.

In grinding and polishing processing, the glass plate 10 is ground and then polished.

In grinding processing, a double-side grinding apparatus provided with a planetary gear mechanism is used to grind the main surfaces 12 of the glass plate 10. Specifically, the main surfaces 12 on both sides of the glass plate 10 are ground while the edge surface 14 of the outer circumferential edge portion of the glass plate 10 is held in a holding hole provided in a holding member of the double-side grinding apparatus. The double-side grinding apparatus has a pair of upper and lower surface plates (an upper surface plate and a lower surface plate), and the glass plate 10 is held between the upper surface plate and the lower surface plate. Then, it is possible to grind the two main surfaces 12 of the glass plate 10 by moving the glass plate 10 and the surface plates relative to each other while moving one or both of the upper surface plate and the lower surface plate and supplying a coolant.

Grinding members obtained by forming fixed abrasive particles in which diamonds are fixed by resin into a sheet shape may be mounted on the surface plates, and then grinding processing may be performed, for example.

Then, first polishing is performed on the main surfaces 12 of the ground glass plate 10. Specifically, the main surfaces 12 on both sides of the glass plate 10 are polished while the edge surface 14 of the outer circumferential edge portion of the glass plate 10 is held in a holding hole provided in a polishing carrier of the double-side polishing apparatus. The first polishing is per in order to remove blemishes and strain remaining on the ground main surfaces 12 or adjust minute unevenness (micro-waviness and roughness) remaining on the surfaces.

In the first polishing processing, the glass plate 10 is polished using a double-side, polishing apparatus having a configuration similar to that of the above-described double-side grinding apparatus that is used in the grinding processing with fixed abrasive particles, while a polishing slurry is provided. In the first polishing processing, a polishing slurry containing loose abrasive particles is used, Cerium oxide abrasive particles, zirconia abrasive particles, or the like are used as loose abrasive particles used in the first polishing, for example. Similar to the double-side grinding apparatus, the glass plate 10 is also held between the upper surface plate and the lower surface plate in the double-side polishing apparatus. Tabular polishing pads (resin polishers, for example) having an overall annular shape are attached to the upper surface of the lower surface plate and the bottom surface of the upper surface plate. The glass plate 10 and the surface plates are moved relative to each other by moving one or both of the upper surface plate and the lower surface plate, and thereby the two main surfaces 12 of the glass plate 10 are polished. The size of polishing abrasive particles is preferably in a range of 0.5 to 3 μm in terms of an average particle diameter (D50).

The glass plate 10 may be chemically strengthened after the first polishing. In this case, a melt in which potassium nitrate and sodium nitrate are mixed, for example, can be used as the chemical strengthening liquid, and the glass plate 10 is immersed in the chemical strengthening liquid. Accordingly, it is possible to form a compressive stress layer on the surface of the glass plate 10 through ion exchange.

Then, the second polishing is performed on the glass plate 10. The second polishing processing is performed in order to mirror-polish the main surfaces 12. A double-side polishing apparatus having a configuration that is similar to that of the double-side polishing apparatus used in the first polishing is used in the second polishing as well, Specifically, the main surfaces 12 on both sides of the glass plate 10 are polished while the edge surface 14 of the outer circumferential edge portion of the glass plate 10 is held in a holding hole provided in a polishing carrier of the double-side polishing apparatus. The second polishing processing differs from the first polishing processing in that the type and particle size of loose abrasive particles are different, and the hardness of the resin polishers is also different. It is preferable that the hardness of a resin polisher is smaller than that in the first polishing processing. A polishing liquid containing colloidal silica as loose abrasive particles is supplied between the polishing pads of the double-side polishing apparatus and the main surfaces 12 of the glass plate 10, and the main surfaces 12 of the glass plate 10 are polished, for example. The size of the polishing abrasive particles used in the second polishing is preferably in a range of 5 to 50 nm in terms of an average particle diameter (d50).

Note that whether or not chemical strengthening processing is to be carried out need only be selected as appropriate in consideration of the composition of the glass and how necessary chemical strengthening processing may be therefor. Other polishing processing may also be performed in addition to the first polishing processing and the second polishing processing, or processing for polishing two main surfaces 12 may be completed through single polishing processing. Also, the order of the above-described processes may be changed as appropriate.

It is possible to obtain a magnetic-disk glass substrate that satisfies the conditions required for a glass plate 10 for a magnetic disk by polishing main surfaces 12 of the glass plate 10 in this manner.

Thereafter, a magnetic disk can be produced fry forming at least a magnetic layer on the glass plate 10 produced by polishing the main surfaces 12.

The main surfaces 12 of the glass plate 10 subjected to shape processing are ground or polished in the method for manufacturing the glass plate 10. In this case, no edge surfaces 14 are polished after the edge surfaces 14 are processed and before the main surfaces 12 are ground or polished, or even if an edge surface 14 is polished, the amount of machining allowance for polishing an edge surface 14 can be set to 5 μm or less. Thus, it is possible to set a change in the outer diameter of the glass plate 10 to 10 μm or less. This is because it is possible to form the chamfered surfaces 14c and the side wall surface 14t with low surface unevenness using the laser beam L.

In recent years, there has been increasing demand for increasing the storage capacity of hard disk drive devices for big data analysis and the like. Therefore, attempts have been made to increase the number of magnetic disks to be mounted on one hard disk drive device, if attempts are to be made to increase the storage capacity by increasing the number of magnetic disks to be incorporated into a hard disk drive device, the thickness of a magnetic-disk glass substrate occupying the majority of the thickness of a magnetic disk in the limited space in the magnetic disk drive device needs to be reduced.

Here, if the thickness of the magnetic-disk glass substrate is reduced, the rigidity of the glass substrate decreases, large vibration is likely to occur, and the vibration is unlikely to stop. When the amplitude of vibration of a glass substrate is high, a magnetic disk often comes into contact with an adjacent magnetic disk, and a magnetic disk located at the top of multiple magnetic disks arranged at regular intervals may also come into contact with a ceiling surface of a magnetic disk storage container of a hard disk drive device. There are also cases where a portion of a magnetic disk is chipped and particles are formed when such contact occurs.

Thus, it is not preferable that the rigidity of a magnetic-disk glass substrate is low. In this regard, with regard to the glass plate 10 used in the above-described shape processing, according to an embodiment, the Young's modulus of the glass plate 10 is preferably 70 [GPa] or more, more preferably 80 [GPa] or more, and even more preferably 90 [GPa] or more.

Furthermore, when the glass plate 10 is used as a blank of a magnetic-disk glass substrate, the thickness Th of the glass plate 10 is preferably 0.7 mm or less, and more preferably 0.6 mm or less. As the thickness Th decreases, it is possible to increase the number of magnetic disks to be mounted on a hard disk drive device.

Although the composition of such a glass plate 10 is not limited, the following composition is preferable.

Glass 1

$SiO_2$ 56 mol % to 80 mol %,
$Li_2O$ 1 mol % to 10 mol %,
$B_2O_3$ 0 mol % to 4 mol %, and
a total content of MgO and CaO (MgO+CaO) 9 mol % to %.

The glass 1 has a specific gravity of 2.75 $g/cm^3$ or less, and a glass transition temperature Tg of 650° C. or higher.

Glass 2

$SiO_2$ 56 mol % to 80 mol %,
$Li_2O$ 1 mol % to 10 mol %,
$B_2O_3$ 0 mol % to 4 mol %,
a total content of MgO and CaO (MaO+CaO) 4 mol % to 40 mol %, and
a mole ratio of a total content of $SiO_2$ and $ZrO_2$ relative to an $Al_2O_3$ content (($SiO_2$+$ZrO_2$)/$Al_2O_3$) ranges from 2 to 13.

The glass 2 has a specific gravity of 2.50 $g/cm^3$ or less, a glass transition temperature Tg of 500° C. or higher, and a specific elastic modulus of 30 $GPa \cdot cm^3/g$ or more at 20° C.

Glass 3

Amorphous oxide glass contains $SiO_2$ in an amount of 56 mol % to 65 mol %,
$Al_2O_3$ in an amount of 5 mol % to 20 mol %,
$B_2O_3$, in an amount of 0 mol % to 4 mol %,
MgO in an amount of 3 mol % to 28 mol %, and
$L_2O$ in an amount of 1 mol % to 10 mol %,
in which a total content of $SiO_2$ and $Al_2O_3$ ($SiO_2$+$Al_2O_3$) ranges from 65 mol % to 80 mol %,
a total content of MgO and (MgO+CaO) ranges from 11 mol % to 30 mol %, a total content of MgO, CaO, SrO, and BaO (MgO+CaO+SrO+BaO) ranges from 12 mol % to 30 mol %,
a sum of the MgO content, 0.7×the CaO content, the $Li_2O$ content, the $TiO_2$ content, and the $ZrO_2$ content (MgO+0.7CaO+SrO+$TiO_2$+$ZrO_2$) is more than or equal to 16 mol %,
a sum of 5×the $Li_2O$ content, 3×the $Na_2O$ content, 3×the $K_2O$ content, 2×the $B_2O_3$ content, the MgO content, 2×the CaO content, 3×the SrO content, and the BaO content (5$Li_2O$+3$Na_2O$+3$K_2O$+2$B_2O_3$+MgO+2CaO+3SrO+BaO) ranges from 32 mol % to 58 mol %,
a sum of the $SiO_2$ content, the $Al_2O_3$ content, the $B_2O_3$ content, the $P_2O_5$ content, 1.5×the $Na_2O$ content, 1.5×the $K_2O$ content, 2×the SrO content, 3× the BaO content, and the ZnO content ($SiO_2$+$Al_2O_3$+$B_2O_3$+$P_2O_5$+1.5$Na_2O$+1.5$K_2O$+2SrO+3BaO+ZnO) is less than or equal to 86 mol %,
a sum of the $SiO_2$ content, the $Al_2O_3$ content, the $B_2O_3$ content, the $P_2O_5$ content, the $Na_2O$ content, the $K_2O$ content, the CaO content, 2×the SrO content, and 3×the BaO content ($SiO_2$+$Al_2O_3$+$B_2O_3$+$P_2O_5$+$Na_2O$+$K_2O$+CaO+2SrO+3BaO) is less than or equal to 92 mol %,
a mole ratio of the CaO content relative to the MgO content (CaO/MgO) is less than or equal to 2.5,
a mole ratio of the $Na_2O$ content relative to the $Li_2O$ content ($Na_2O$/$Li_2O$) is less than or equal to 5,
a mole ratio of the $Li_2O$ content relative to the total content of MgO and CaO ($Li_2O$/(MgO+CaO)) ranges from 0.03 to 0.4,
a mole ratio of the $SiO_2$ content relative to the total content of $Li_2O$, $Na_2O$, and $K_2O$ ($SiO_2$/($Li_2O$+$Na_2O$+$K_2O$)) ranges from 4 to 22,
a mole ratio of the total content of $SiO_2$ and $ZrO_2$ relative to the $Al_2O_3$ (($SiO_2$+$ZrO_2$)/$Al_2O_3$) ranges from 2 to 10,
a mole ratio of the total content of $TiO_2$ and $Al_2O_3$ relative to the total content of MgO and CaO (($TiO_2$+$Al_2O_3$)/(MgO+CaO)) ranges from 0.35 to 2,
a mole ratio of the total content of MgO and CaO relative to the total content of MgO, SrO, and BaO ((MgO+CaO)/(MgO+CaO+SrO+BaO)) ranges from 0.7 to 1, a mole ratio of the BaO content relative to the total content of MgO, CaO, SrO, and BaO (BaO/(MgO+CaO+SrO+BaO)) is less than or equal to 0.1,
and a mole ratio of the $P_2O_5$ content relative to the total content of $B_2O_3$, $SiO_2$, $Al_2O_3$, and $P_2O_5$($P_2O_5$/($B_2O_3$+$SiO_2$+$Al_2O_3$+$P_2O_5$)) is less than or equal to 0.005,
the oxide glass has a glass transition temperature of 670° C. or higher and a Young's modulus of 90 GPa or more,
a specific gravity of 2.75 or less, and
an average coefficient of linear thermal expansion at 100° C. to 300° C. ranges from $40 \times 10^{-7}$ to $70 \times 10^{-7}/°$ C.

According to an embodiment, the glass plate 10 is preferably composed of glass having a glass transition point Tg of 500° C. or higher, and the glass transition point Tg is more preferably 650° C. or higher. The higher the glass transition point Tg is, the more thermal shrinkage that occurs when the glass plate 10 is heated and deformation caused by thermal shrinkage can be suppressed. Thus, the glass transition point Tg is preferably set to 500° C. or higher, and more preferably set, to 650° C. or higher in consideration of heat treatment performed to form a magnetic film for a magnetic disk or the like on a substrate 1.

According to an embodiment, the glass plate 10 is preferably composed of a material having a coefficient of linear thermal expansion of $100 \times 10^{-7}$ [1/K] or less, more preferably composed of a material having a coefficient of linear thermal expansion of $95 \times 10^{-7}$ [1/K] or less, even more preferably composed of a material having a coefficient of linear thermal expansion of $70\times10^{-7}$ [1/K] or less, and particularly preferably composed of a material having a coefficient of linear thermal expansion of $60\times10^{-7}$ [1/K] or less. The lower limit of the coefficient of linear thermal expansion of the glass plate 10 is not particularly limited, and the linear thermal expansion coefficient of the glass plate 10 is $5\times10^{-7}$ [1/K], for example. A "coefficient of linear thermal expansion" here refers to a coefficient of linear thermal expansion obtained by a difference between thermal expansion at 100° C. and thermal expansion at 300° C. As a result of using such a coefficient of linear thermal expansion, it is possible to suppress thermal expansion in heat treatment when forming a magnetic film or the like, and to suppress thermal strain in the glass plate 10 around a holding portion when a holding member of a film forming device fixes the glass plate 10 and holds an edge surface 14 of the outer circumferential edge portion thereof. A conventional substrate made of an aluminum alloy has a coefficient of linear thermal expansion of $242\times10^{-7}$ [1/K], whereas the glass plate 10 according to an embodiment has a coefficient of linear thermal expansion of $51\times10^{-7}$ [1/K], for example.

Experimental Examples

In the method for manufacturing the glass plate 10 in this embodiment, the effect of suppressing a distribution of in-plane strain in the main surface 12 of the glass plate 10 was examined by floating the glass plate 10 above the placement surface 18 of the base during irradiation with the laser beam L. The outer diameter of the glass plate 10 was 95 mm, the inner diameter of the inner hole was 25 mm, and the thickness Th was 0.7 mm. The above-described glass 1 was used as the glass composition of the glass plate 10.

In heating performed before irradiation with the laser beam L and during irradiation with the laser beam the heating was adjusted such that the temperature at which the glass plate 10 was heated reached 350° C. at a position located 30 mm away from the center of the glass plate 10.

Strain Distribution Measurement

Variation in the retardation values was used in the strain distribution of the main surface 12. The difference between the maximum value and the minimum value of the retardation values at twelve measurement points in the circumferential direction and the radial direction of the main surface 12 was obtained as the variation in the retardation values. The radial positions of the twelve measurement points include, three positions that are located radially outward away from the inner circumferential edge surface by 25%, 50%, and 75%, where the inner circumferential edge surface of the disk-shaped glass plate 10 is 0% and the outer circumferential edge surface thereof is 100%. On the other hand, the circumferential positions of the measurement points include four positions on the circumference that are located away from each other at 90 degrees (the positions at 0 degrees, 90 degrees, 180 degrees, and 270 degrees). The above-described twelve measurement points were irradiated with linearly polarized light, and the retardation values of the polarized light that had passed through the glass plate 10 were measured.

Temperature Distribution Measurement

With regard to the temperature distribution in the heated glass plate 10, variation in the measured temperature of the glass plate 10 was used. In the temperature distribution measurement, the glass plate 10 was heated in the same method as in the irradiation with the laser beam L without irradiating the edge surface 14 with the laser beam L. At this time, the temperatures at the twelve measurement points on the main surface 12 were measured at the same timing as the timing of starting irradiation with the laser beam L. A non contact thermometer (thermography) was used in the temperature measurement. The difference between the maximum temperature and the minimum temperature at the twelve measurement points was obtained, aid the difference therebetween was used as temperature variation.

The irradiation conditions of the laser beam L were as follows: the width W1 was 1 mm, the length W2 was 10 mm, and Pd was 5.1 [W/mm$^2$]. The moving speed of the laser beam L along the edge surface 14 was set to 20 [mm/sec].

Table 1 below shows the results of the strain distribution measurement and temperature distribution measurement in Comparative Examples 1 and 2 and Examples 1 to 4.

In Comparative Example 1, the glass plate 10 was placed and heated on a hot plate heater having a cylindrical base with a circular hole inner diameter of 45 mm and an outer diameter of 75 mm. In Comparative Example 2, the glass plate 10 was placed and heated on a hot plate heater having a cylindrical base with a circular bole inner diameter of 35 mm and an outer diameter of 85 mm.

In Examples 1 and 2, the glass plate 10 was floated above the placement surface 18, and the glass plate 10 was heated using a spot-type halogen lamp heater that can adjust the heating region from above. Examples 1 and 2 are different from each other in the distance between the halogen lamp heater and the glass plate 10, and the input power of the halogen lamp heater.

In Example 3, the glass plate 10 was floated above the placement surface 18, and the glass plate 10 was heated using a spot-type carbon heater that can adjust the heating region from above.

In Example 4, the main surface 12 was irradiated and heated with a circular laser beam having an irradiation region with a diameter of 100 mm.

In Examples 1 to 4, a non-contact chuck utilizing the Bernoulli effect was disposed on the lower surface side of the main surface 12 as the base, and the glass plate 10 was floated and fixed thereto.

TABLE 1

|  | Temperature Variation [° C.] | Strain (Retardation Value) Variation [nm] |
|---|---|---|
| Comp. Ex. 1 | 100 | 54 |
| Comp. Ex. 2 | 70 | 43 |
| Ex. 1 | 70 | 29 |
| Ex. 2 | 50 | 20 |
| Ex. 3 | 20 | 9 |
| Ex. 4 | 10 | 5 |

With Examples 1 to 4 in which the glass plate 10 was floated above the placement surface 18 and heated, the variation in strain (retardation values) was 30 [nm] or less, which is smaller than and preferable to that in Comparative Examples 1 and 2 in which the glass plate 10 was brought into contact with the placement surface 18 and heated. With Examples 2 to 4, the above-described variation was 20 [nm] or Less, and thus Examples 2 to 4 are more preferable. Furthermore, based on the comparison between Example 1 and Comparative Example 2, it can be seen that variation in strain can be reduced by floating the glass plate 10 even though they have the same temperature variation.

Accordingly, it can be seen that a distribution of in-plane strain in the main surface 12 of the glass plate 10 was suppressed by floating the glass plate 10 above the placement surface 18 of the base.

As described above, although a method for manufacturing a glass plate and a method for manufacturing a magnetic disk according to the present invention have been described in detail, the method for manufacturing a glass plate and the method for manufacturing a magnetic disk according to the present invention are not limited to the above-described embodiment, and it will be appreciated that various improvements and modifications can be made without departing from the gist of the present invention.

The invention claimed is:

1. A method for manufacturing a glass plate including processing for performing shape processing on an edge surface of a disk-shaped glass plate, the method comprising:

floating the disk-shaped glass plate above a base in a state where the disk-shaped glass plate is not supported by a support tool;

preheating the disk-shaped glass plate by contactlessly heating an entirety of the disk-shaped glass plate uniformly in a state where the disk-shaped glass plate is floated, the preheating being performed such that an in-plane temperature difference in a middle circumferential portion of at least one of a pair of main surfaces of the disk-shaped glass plate is 50° C. or less, the middle circumferential portion being a portion located 25% or more away from an inner circumferential end of the at least one of the pair of main surfaces and from an outer circumferential end of the at least one of the pair of main surfaces; and processing the edge surface of the disk-shaped glass plate into a target shape by softening and/or melting the edge surface, the softening and/or melting being performed by irradiating with a laser beam the edge surface of the disk-shaped glass plate that has been preheated in the state where the disk-shaped glass plate is floated, and by rotating the disk-shaped glass plate to move the laser beam relative to the edge surface in a circumferential direction of the disk-shaped glass plate, the preheating in the state where the disk-shaped glass plate is floated being performed and completed, prior to the processing of the edge surface of the disk-shaped glass plate, and the in-plane temperature difference in the middle circumferential portion being kept 50° C. or less during the processing of the edge surface, such that a difference of a maximum retardation value and a minimum retardation value among retardation values of twelve measurement points in the at least one of the pair of main surfaces of the disk-shaped glass plate is 30 nm or less, the twelve measurement points including four points on a circumference that are located away from each other at 90 degrees at each of three radial positions that are located radially outward away from the inner circumferential end by 25%, 50%, and 75% in the at least one of the pair of main surfaces of which the inner circumferential end is set to be 0% and of which the outer circumferential end is set to be 100%.

2. The method for manufacturing a glass plate according to claim 1, wherein, in the processing the edge surface into the target shape, irradiation conditions of the laser beam are set so as to form a chamfered surface on the edge surface.

3. The method for manufacturing a glass plate according to claim 2, wherein the conditions are set such that a ratio C/Th of a length C of the chamfered surface extending in a radial direction of a main surface of the disk-shaped glass plate, relative to a thickness Th of the disk-shaped glass plate is in a range of 0.1 to 0.7.

4. The method for manufacturing a glass plate according to claim 1, wherein an arithmetic average roughness Ra of the edge surface formed by the laser beam is 0.02 μm or less.

5. The method for manufacturing a glass plate according to claim 1, wherein a ratio W2/D of a length W2 in the circumferential direction of luminous flux of the laser beam with which the edge surface is irradiated, relative to a diameter D of the disk-shaped glass plate before being irradiated with the laser beam is in a range of 0.03 to 0.2.

6. The method for manufacturing a glass plate according to claim 1, wherein a cross-sectional intensity distribution of the laser beam with which the edge surface is irradiated is a single mode, and W1>Th holds true and Pd×Th is in a range of 0.8 to 3.5 (W/mm) where a width of luminous flux of the laser beam in a thickness direction of the disk-shaped glass plate at an irradiation position of the edge surface is W1 (mm), a thickness of the disk-shaped glass plate is Th (mm), and a power density of the laser beam is Pd.

7. The method for manufacturing a glass plate according to claim 6, wherein the power density Pd is set such that a diameter of the disk-shaped glass plate formed through irradiation with the laser beam is larger than a diameter of the disk-shaped glass plate before being irradiated with the laser beam.

8. The method for manufacturing a glass plate according to claim 1, wherein a moving speed at which the laser beam relatively moves along the edge surface is in a range of 0.7 to 140 (mm/s).

9. The method for manufacturing a glass plate according to claim 1, wherein the disk-shaped glass plate has a Young's modulus of 70 (GPa) or more.

10. The method for manufacturing a glass plate according to claim 1, wherein the disk-shaped glass plate has a coefficient of linear thermal expansion of $100\times10^{-7}$ (1/K) or less.

11. The method for manufacturing a glass plate according to claim 1, wherein the disk-shaped glass plate has a thickness Th of 0.7 mm or less.

12. The method for manufacturing a glass plate according to claim 1, further comprising grinding or polishing a main surface of the disk-shaped glass plate in which the edge surface has been processed into the target shape, wherein no edge surface is polished after the edge surface has been processed into the target shape and before the main surface is ground or polished.

13. A method for manufacturing a magnetic disk, wherein a magnetic film is formed on a main surface of the disk-shaped glass plate manufactured using the method for manufacturing a glass plate according to claim 1.

14. The method for manufacturing a glass plate according to claim 1, further comprising grinding or polishing a main surface of the disk-shaped glass plate in which the edge surface has been processed into the target shape, and polishing the edge surface after the edge surface has been processed into the target shape and before the main surface is ground or polished, the polishing of the edge surface being performed such that an amount of machining allowance for polishing the edge surface is 5 μm or less.

15. A method for manufacturing a glass plate including processing for performing shape processing on an edge surface of a disk-shaped glass plate, the method comprising:

disposing the disk-shaped glass plate, a support tool, and a base such that the disk-shaped glass plate does not come into contact with the support tool and the base;

preheating the disk-shaped glass plate by heating an entirety of the disk-shaped glass plate uniformly in a state where the disk-shaped glass plate is not in contact with the support tool and the base, the preheating being performed such that an in-plane temperature difference in a middle circumferential portion of at least one of a pair of main surfaces of the disk-shaped glass plate is 50° C. or less, the middle circumferential portion being a portion located 25% or more away from an inner circumferential end of the at least one of the pair of main surfaces and from an outer circumferential end of the at least one of the pair of main surfaces; and processing the edge surface of the disk-shaped glass plate into a target shape by softening and/or melting the edge surface, the softening and/or melting being performed by irradiating with a laser beam the edge surface in a state where the disk-shaped glass plate has been preheated and is not in contact with the base and the support tool, and by rotating the disk-shaped glass plate to move the laser beam relative to the edge surface in a circumferential direction of the disk-shaped glass plate, the preheating in the state where the disk-shaped glass plate is not in contact with the support tool and the base being performed and completed, prior to the processing of the edge surface of the disk-shaped glass plate, and the in-plane temperature difference in the middle circumferential portion being kept 50° C. or less during the processing of the edge surface, such that a difference of a maximum retardation value and a minimum retardation value among retardation values of twelve measurement points in the at least one of the pair of main surfaces of the disk-shaped glass plate is 30 nm or less, the twelve measurement points including four points on a circumference that are located away from each other at 90 degrees at each of three radial positions that are located radially outward away from the inner circumferential end by 25%, 50%, and 75% in the at least one of the pair of main surfaces of which the inner circumferential end is set to be 0% and of which the outer circumferential end is set to be 100%.

* * * * *